United States Patent [19]

Robins

[11] 4,293,120
[45] Oct. 6, 1981

[54] TIRE HOLDER AND BEAD EXPANDER

[76] Inventor: Robert R. Robins, 721 N. Woodland, Minneapolis, Kans. 67467

[21] Appl. No.: 126,923

[22] Filed: Mar. 3, 1980

[51] Int. Cl.³ .................... G01M 17/02; B60C 25/14
[52] U.S. Cl. .................................. 254/50.2; 254/50.3
[58] Field of Search ...................... 254/50.1–50.4; 157/1

[56] References Cited

U.S. PATENT DOCUMENTS

| | | | |
|---|---|---|---|
| 1,697,708 | 1/1929 | Blackman | 254/50.2 |
| 1,848,961 | 3/1932 | Manley | 254/50.3 |
| 1,853,146 | 4/1932 | Prentice et al. | 254/50.2 |
| 1,863,764 | 6/1932 | Prentice | 254/50.2 |
| 2,895,711 | 3/1959 | Branick | 254/50.3 |
| 3,540,697 | 11/1970 | Matteuzzi | 254/50.2 |
| 3,830,469 | 8/1974 | Oaks | 254/50.3 |

*Primary Examiner*—Robert C. Watson
*Attorney, Agent, or Firm*—Robert K. Rhea

[57] ABSTRACT

An upright generally rectangular frame includes a pair of base members transversely journalling a spaced-apart pair of power driven rollers for vertically supporting, in rolling relation, a tire rolled into the frame through one of its ends. A pair of brake chambers, supported by the base members, are connected with moveable arms having tire bead engaging rollers thereon for spreading the opposing tire beads apart.

1 Claim, 4 Drawing Figures

TIRE HOLDER AND BEAD EXPANDER

BACKGROUND OF THE INVENTION

1. Field of the invention

The present invention relates to tire inspection and repair and more particularly to an apparatus for spreading tire beads in opposing directions for examining a tire carcass for damage.

The mass of large size tires, such as are used on farm implements, earth moving equipment or large trucks, render it difficult to adequately inspect the inside surfaces of such tires for sidewall damage or air leaks.

This invention provides an apparatus which will simultaneously rotate and spread the tire beads apart for inspection of the inner surfaces of the tire.

2. Description of the prior art

Prior patents generally relate to the inspection of pneumatic tire tubes or tubeless tires wherein a portion of or the entire tube or tire, while inflated, is immersed but do not disclose separating tire beads in order to examine the inside surfaces of the tire walls.

The present invention overcomes this disadvantage by providing an apparatus which will support the tire in a vertical position and spread the tire beads in opposing directions.

SUMMARY OF THE INVENTION

An upright generally rectangular frame includes spaced-apart longitudinal base members having a ramp at one end portion for rolling a tire into the frame. The base members transversely journal a pair of spaced-apart rollers which support the tire when disposed within the frame. At least one of the rollers is driven by a motor for rotating the tire while within the frame. Guide rollers extend inwardly from the other end of the frame for supporting the tire vertically. A pair of tire bead engaging arms are pivotally supported by links pivotally connected with the frame base members for vertical pivoting movement of the arms toward and away from the tire beads. The links are moved by a pair of brake chambers supported by the frame for imparting horizontal outward movement to the arms when engaged with the tire beads to achieve a spreading apart action of the tire beads. The device further includes a water supply line and spray head for testing a wheel mounted tubeless tire for air leaks when disposed within the frame.

The principal object of this invention is to provide a device for revolvably supporting a tire and spreading the beads thereof in opposing directions for inspecting the inner wall surfaces of the tire.

DESCRIPTION OF THE PREFERRED EMBODIMENT

Figure 1:
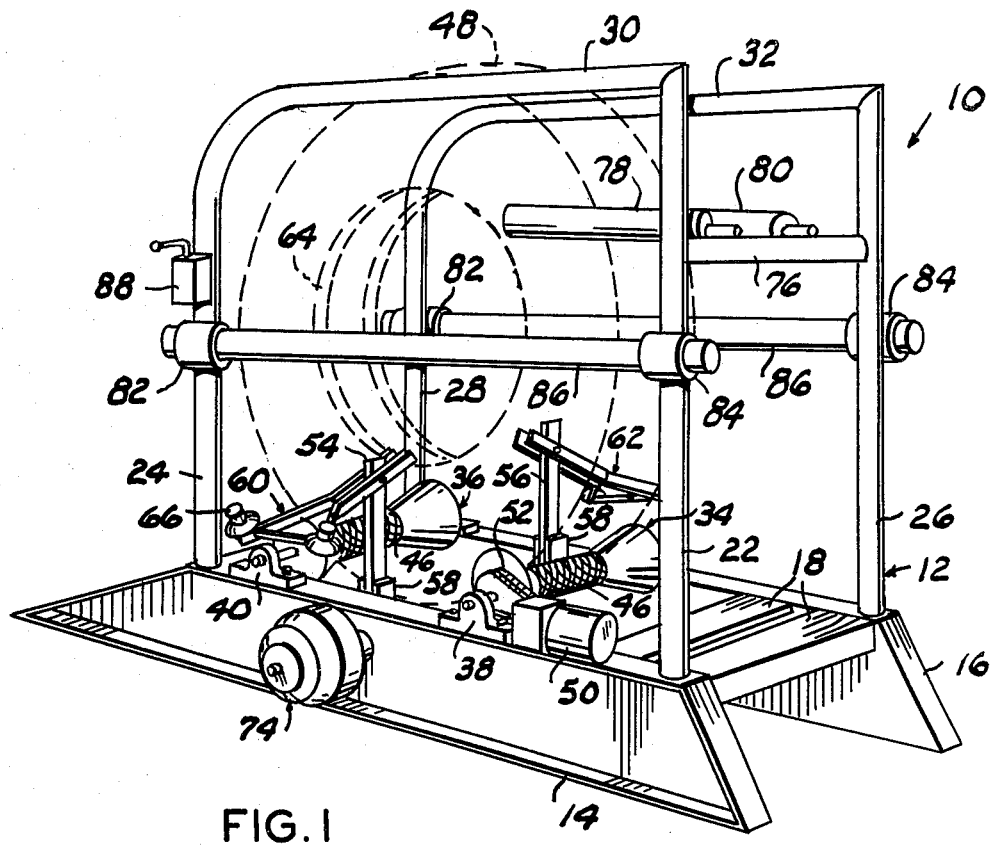
FIG. 1 is a perspective view of the device illustrating, by dotted lines, the relative position of a tire when supported thereby.
Figure 2:
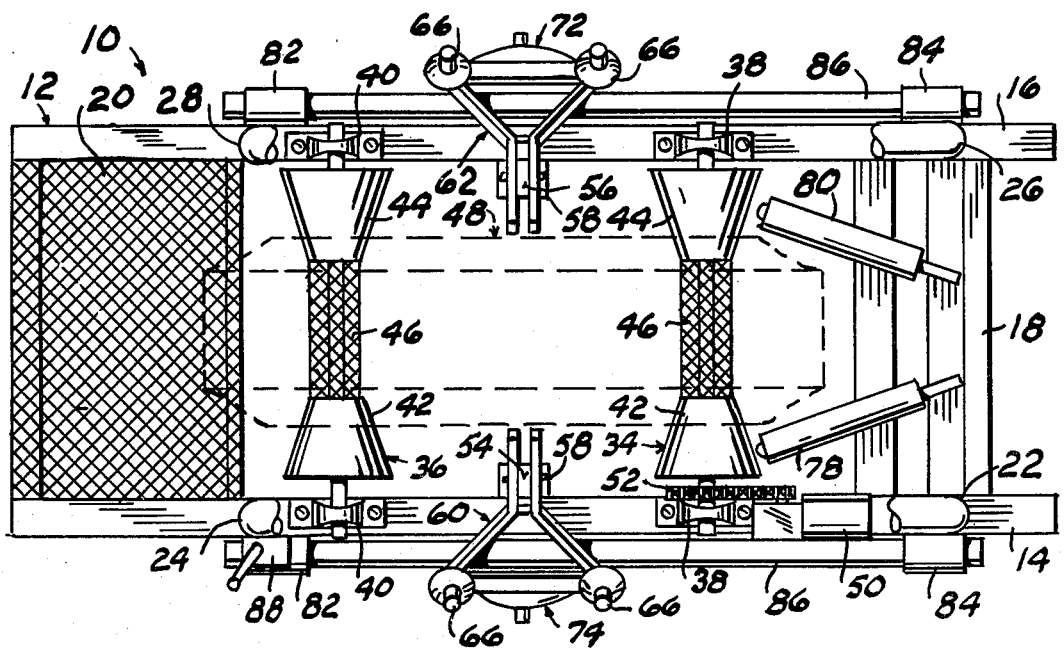
FIG. 2 is a top view of FIG. 1.
Figure 3:
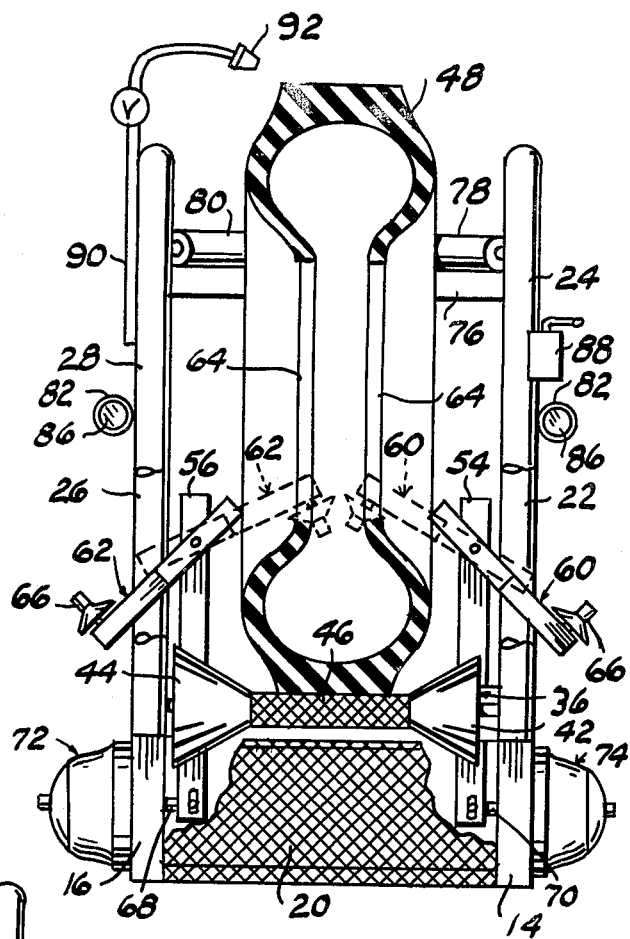
FIG. 3 is a fragmentary left end elevational view of FIG. 1 with parts broken away for clarity and illustrating, in vertical cross section, a tire supported thereby and illustrating, by dotted lines, the vertical pivoting movement of the tire bead engaging arms; and, FIG. 4 is a view similar to FIG. 3 illustrating the apparatus in tire bead spreading position.

Like characters of reference designate like parts in those figures of the drawings in which they occur.

In the drawings:

The reference numeral 10 indicates the device, as a whole, which is upright rectangular in general configuration comprising a frame 12 formed by a pair of longitudinally extending transversely spaced-apart base members 14 and 16 interconnected at one end by suitable brace members 18 and interconnected at their other ends by an inclined ramp 20. The frame further includes standards 22, 24, 26 and 28, one for each corner of the frame, with the standards 22-24 and 26-28 at the respective sides of the frame respectively connected together by horizontal top bars 30 and 32. A pair of spaced-apart axle equipped tire support rollers 34 and 36 extend transversely of the frame intermediate the ends of the base members 14 and 16 and are journalled at their respective end portions by bearings 38 and 40 overlying the respective base member.

Each of the support rollers 34 and 36 are characterized by truncated conical end members 42 and 44 disposed in horizontal coaxial alignment with their truncated ends joined by a cylindrical section of expanded metal 46, or the like. The purpose of the conical end portions 42 and 44 is to guide the tread of a large size tire 48 toward the central portion of the respective support roller for contact by its tread with the expanded metal sections 46. The support roller 34 is angularly rotated by a gear train equipped motor 50 mounted on the base member 14 and connected with the roller, as by a chain 52, or the like. The support roller 36 is preferably connected in a conventional manner with the support roller 34, as by belts or chains, not shown, for angular rotation simultaneously with the support roller 34.

A pair of upstanding links 54 and 56 are pivotally connected intermediate their ends by brackets 58 secured to the inner surface of the base members 14 and 16, respectively, in transversely aligned relation medially the spacing between the support rollers 34 and 36. A pair of tire bead engaging arms 60 and 62 are pivotally and adjustably connected at one end portion with the upper end portion of the respective links 54 and 56 for vertical pivoting movement of the arms toward and away from the beads 64 of the tire. The other end portion of the arms 60 and 62 are bifurcated to define a substantial Y-shape and include tire bead engaging rollers 66 journalled on an axis perpendicular to the respective leg of the Y-shape. The depending end portions of the links 54 and 56 are respectively pivotally connected with the pistons 63 and 70 of a pair of fluid pressure operated members, such as conventional brake chambers, 72 and 74 cooperatively mounted on the lateral outer surface of the base members 14 and 16. The pistons 68 and 70 project through apertures formed in the respective base member.

A cross brace 76 extends horizontally between the upper end portions of the standards 22 and 26 for supporting a pair of roller-like tire guides 78 and 80 secured at one end to the cross brace 76 and projecting inwardly of the frame in diverging relation for contact with the sidewalls of the tire 48 to maintain the tire vertically disposed within the frame when angularly rotated by the support rollers 34 and 36, as presently described.

A pair of sleeves 82 and 84 are rigidly secured in horizontal alignment intermediate the ends of the respective standards 22-24 and 26-28 for slidably receiving an elongated rod or tube 86 as a safety rail or guard.

A source of electrical energy and a source of air under pressure is connected by wiring and tubing, not shown, with a control box or panel 88 mounted on the frame standard 24. The control box is in turn connected with other tubing and wiring, not shown, with the brake chambers 72 and 74 and the motor 50.

A length of control valve equipped tubing 90 is secured to the frame and connected with a source of fluid under pressure, such as water, not shown, for spraying water through a nozzle 92 on a wheel mounted tubeless tire, not shown, supported by the device in the position of the tire 48.

OPERATION

Figure 4:
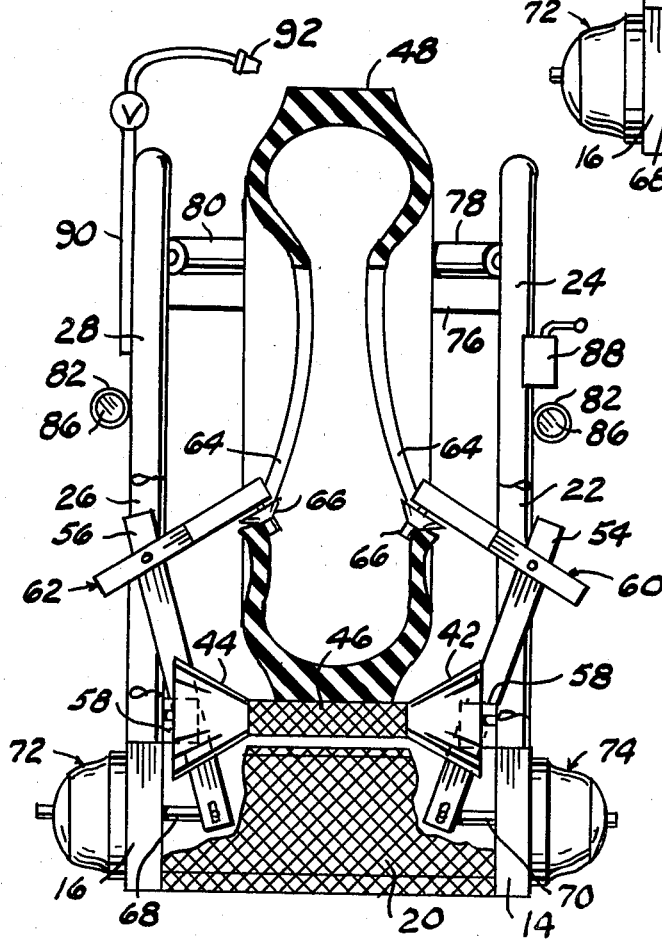

With the device assembled as described, a tire 48 to be inspected is manually rolled into the frame 12 over the ramp 20 and vertically supported by the support rollers 34 and 36 and maintained medially the width of the frame by the guide rollers 78 and 80. The arms 60 and 62 are manually pivoted inwardly of the frame to engage the bead rollers 66 with tire beads 64, assuming, of course, that the arms have been adjusted for cooperative action on the particular tire 48. The brake chambers 72 and 74 are then actuated by the control 88 to extend their pistons and pivot the upper end portion of the links 54 and 56 outwardly with respect to the tire which spreads the tire beads 64 apart, as illustrated by FIG. 4, to permit visual inspection of the inner surfaces of the tire carcass. Simultaneously with this action the motor 50 may be energized to angularly rotate the support rollers 34 and 36 to rotate the tire about its axis wherein the bead roller equipped arms 60 and 62 maintain the tire beads in the position illustrated by FIG. 4. After locating a damaged spot in the tire body or upon finding no damage, the motor is de-energized and the pistons 68 and 70 are retracted to permit removal of the arms 60 and 62 from contact with the tire beads for manually rolling the tire out of the frame 12.

Alternatively, a wheel mounted tubeless tire, not shown, having a suspected air leak may be positioned within the frame as described hereinabove for the tire 48. Water is then sprayed on the upper limit of the tubeless tire through the nozzle 92 with the motor 50 energized to rotate the tire about the axis of its wheel while continuously spraying water until air bubbles indicate the position of an air leak, if present.

Obviously the invention is susceptible to changes or alterations without defeating its practicability. Therefore, I do not wish to be confined to the preferred embodiment shown in the drawings and described herein.

I claim:

1. A tire holder and bead expander, comprising:
an upright generally rectangular frame, said frame including a standard at the respective corner of the frame interconnected at their upper limits by horizontal cross bars at respective lateral sides of the frame,
a pair of horizontal elongated parallel spaced-apart base members respectively underlying the interconnected standards and having inclined upper edge surfaces at their respective ends projecting beyond the vertical axis of the respective standard,
an upwardly inclined ramp at one end of the frame supported by the base member inclined surfaces and terminating upwardly in the horizontal plane of the upper limit of the base members,
a pair of sleeves respectively connected in horizontal alignment to the interconnected standards intermediate their ends, and a pair of tubes respectively supported by said pairs of sleeves;
tire support roller means substantially coextensive with the spacing between said base members and transversely journalled by said base members intermediate their ends,
said tire support roller means including, a pair of support rollers disposed in spaced relation,
each support roller of said pair of support rollers having an axle journalled at its respective end portions by bearings overlying said base members,
a pair of truncated conical members surrounding the axle adjacent the respective bearing with the truncated ends disposed in spaced confronting relation, and,
a cylindrical tread member loosely surrounding said axle and secured to the respective truncated conical member;
motor means drivably connected with at least one said support roller means;
tire bead engaging means pivotally supported by said base members for vertical pivoting movement toward and away from the central portion of said frame,
said tire bead engaging means including a pair of upstanding links pivotally supported intermediate their ends by said base members medially the spacing between said pair of support rollers,
a pair of arms respectively pivotally connected at one end portion with the upper end portion of the respective link of said pair of links,
the other end portion of each arm of said pair of arms being bifurcated and disposed in lateral diverging relation, and,
a tire bead engaging roller journalled by the end portion of the respective diverging arm opposite the respective said link;
fluid pressure operated means for moving said tire bead engaging
means in opposing directions,
said fluid pressure means comprising, a pair of brake chambers respectively supported by said base members,
each brake chamber of said pair of chambers having a piston pivotally connected with the depending end portion of the respective link of said pair of links;
a cross brace extending horizontally between said standards at the end of said frame opposite said ramp; and,
tire guiding means including a pair of elongated guide rollers journalled at one end portion by said cross brace and projecting in diverging relation into said frame on opposing sides of a tire when support by said support rollers.

* * * * *